Feb. 28, 1967    J. F. MACHEN    3,305,893
EXTRUDER
Filed July 9, 1964
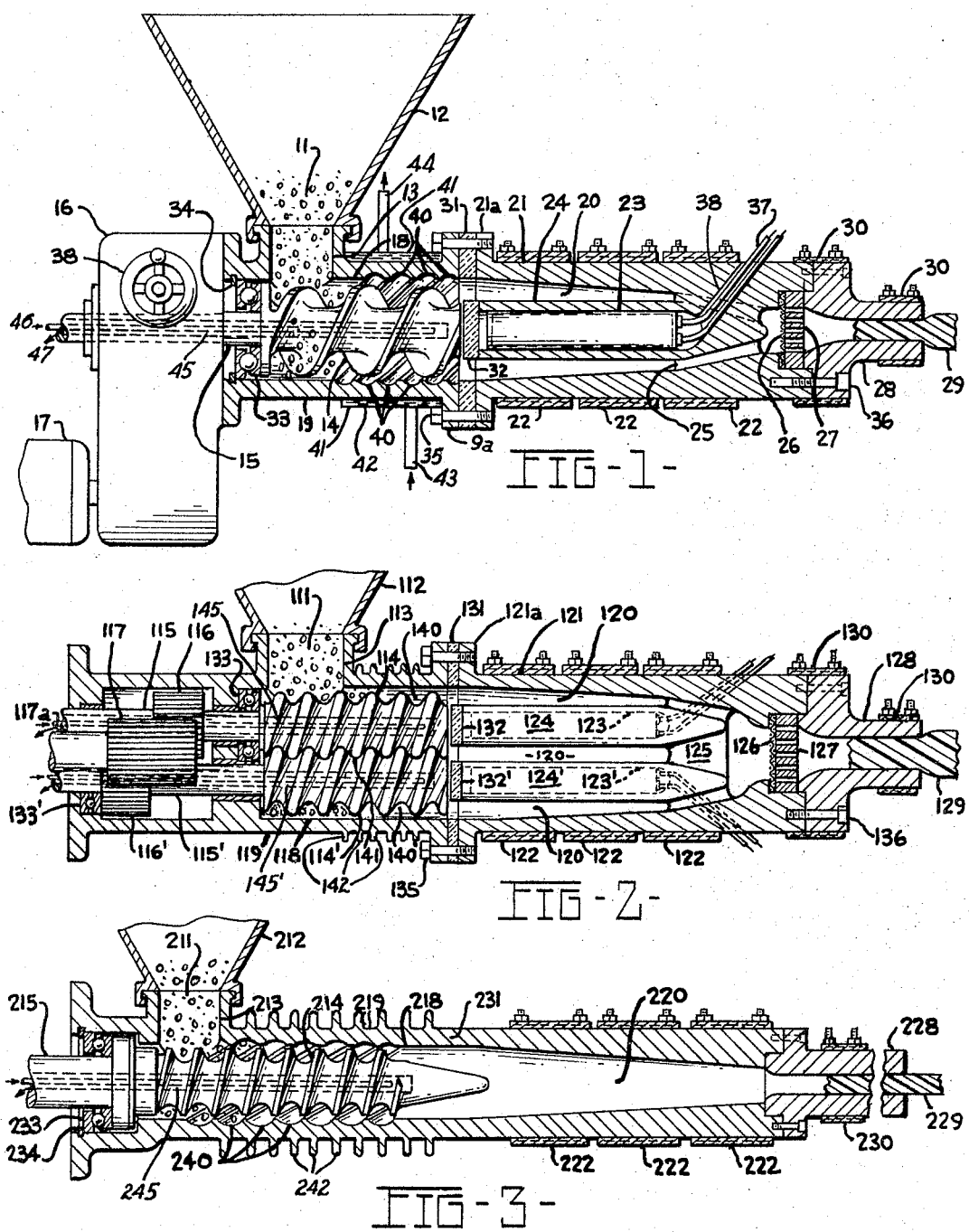
INVENTOR:
James F. Machen United States Patent Office 3,305,893
Patented Feb. 28, 1967

3,305,893
EXTRUDER
James F. Machen, 2495 Robinwood Ave.,
Toledo, Ohio 43620
Filed July 9, 1964, Ser. No. 381,445
3 Claims. (Cl. 18—12)

This invention relates to extruders, especially to those for extruding plastic materials.

A present day conventional screw extruder for thermoplastics in essence performs four basic functions: melting, gas removal, mixing, and pumping. (Other terms may be used, but these will suffice for present purposes.) One major element, the screw, simultaneously performs all of these functions.

The friction and viscous shear forces developed by the screw rotation convert shaft power into heat, thereby indirectly producing all or most of the heat required to melt the plastic (the melting function). Simultaneously, entrapped air and evolved volatiles work their way back through the initial flights of the screw to escape, or are vented by auxiliary means (the gas removal function). Mixing of the thermoplastic melt is induced by viscous shear and counterflow in the melt (the mixing function). Finally, viscous shear acting over the length of the screw builds up considerable forward pressure (the pumping function).

From the standpoint of simplicity, this performing of multiple functions by a single major element is ideal. From the standpoint of efficiency, however, the individual performance of each of these separate functions is far from ideal. Additionally, from the standpoint of control, it is extremely difficult in a conventional extruder to achieve any degree of independent variable control of the individual functions—a change in one of these functions invariably affects the others. Finally, from the standpoint of design, modifications are often required in conventional extruders to accommodate materials with different characteristics.

Consequently, it is an object of this invention to provide an extruder for plastic materials wherein the performance of the separate functions of melting, gas removal, mixing, and pumping may be individually optimized.

Another object of this invention is to provide an extruder which will permit separate control of each of the above functions without design modifications, and while in operation.

Another object is to provide an extruder that will accommodate a wide range of materials without special adaptions or modifications, including certain materials that are not now extrudable with a conventional screw extruder.

Another object of this invention is to provide a screw extruder which is extremely short in length and which requires a much smaller drive motor and speed reduction gearing.

Another object is to provide an extruder that will achieve these objects and yet remain simple in principle, design, construction, and operation.

Other objects and the advantages of this invention will become more apparent from the following description taken together with the drawings, in which:

FIG. 1 is a cross-sectional view of a preferred embodiment of this invention, wherein a single screw is employed and heat is transferred to the material from both internal and external sources.

FIG. 2 is a cross-sectional view of another embodiment of this invention, wherein twin screws are employed and heat is again transferred to the material from both internal and external sources.

FIG. 3 is a cross-sectional view of still another embodiment of this invention, wherein a single screw is employed and heat is transferred to the material only from external sources.

Referring to FIG. 1, raw plastic 11 (in pellet or powder form) contained in supply hopper 12 enters extruder through inlet opening 13. Screw 14, driven by means of shaft 15 from variable speed gear box 16 and powdered from motor 17, rotates in bore 18 of extruder body 19 and forces plastic 11 forward into annular melting chamber 20 of barrel 21.

External electric band heaters 22 supply heat to barrel 21 from the outside, and internal electric cartridge heater 23 supplies heat to torpedo 24 on the inside, so that heat is transferred to the plastic from both the inside and outside walls of the melting chamber. The plastic gradually melts as it is forced along the length of chamber 20. The melt continues past torpedo supports 25, through screen pack 26, through breaker plate 27, and finally out through die head 28 as extrudate 29. Auxiliary electric band heaters 30 maintain the proper temperature at die head 28.

Bearing 33 carries the reverse thrust forces developed against screw 14 in forcing raw plastic 11 forward into melting chamber 20. Retaining ring 34 is provided for bearing 33. Bolts 35 fasten barrel 21 to body 19, and bolts 36 fasten die head 28 to barrel 21. Electrical wiring 37 to torpedo heater 23 passes through drilled holes 38. Crank 39 on gear box 16 provides a means of varying the speed of screw 14 and thus the rate at which plastic is forced through the extruder.

In the embodiment of FIG. 1, pressure in the melt is developed solely by the mechanical action of screw 14 on the relatively cold raw plastic 11, continuously and smoothly force-feeding it forward into melting chamber 20. This purely mechanical action is similar to that of the household "meat grinder" or commercial food chopper. Viscous shear stress of a hydraulic nature contributes only in a small way, if at all, to the pressure build-up.

Helical grooves 40 in bore 18 improve the force-feeding capacity of screw 14 for this purpose. Also, the force-feeding ability of screw 14 is further improved with increased hardness of raw plastic 11. Any plasticity in the raw material lessens the mechanical force-feeding efficiency of screw 14. Since thermoplastics soften with increasing temperatures, it is desired to maintain screw 14 and body 19 at a temperature cool enough such that raw plastic 11 being acted upon remains substantially hard. For purposes of this invention, such "cool" temperature can be construed to be a temperature below 120° F.

The desired cool screw temperature is maintained by internal concentric cooling passages 45 consisting of coolant inlet tube 46 and coolant outlet bore 47, according to conventional practice. The bore 18 is maintained at a suitably cool temperature by means of cooling jacket 41 surrounding body 19. Coolant enters inlet 43, circulates through cooling chamber 42, and leaves through outlet 44, again according to conventional practice.

Because of the relatively short screw length typical to the embodiment of FIG. 1, the screw itself often has enough heat conducting capacity through its short length that bearing 33 and rearward adjacent parts can effectively act as a heat sink or "cooling means" for screw 14.

Insulation 31 maintains the steepest possible temperature gradient between flange 19a of body 19 and flange 21a of melting chamber 21, thus contributing to the efficiency of cooling and the short and compact length of the extruder of this invention. Insulation 32 serves a similar purpose between screw 14 and torpedo 24.

Referring to FIG. 2, similarly, raw plastic 111 (in pellet or powder form) contained in supply hopper 112 enters the extruder through inlet opening 113. Twin screws 114 and 114', in mesh and rotating in the same direction, are driven by means of shafts 115 and 115' through gears 116 and 116' from drive gear 117 which may be powered from an outside source (such as that of FIG. 1) through input shaft 117a. The rotation of screws 114 and 114' in mesh in twin bore 118 of extruder body 119 forces plastic 111 forward into melting chamber 120 of barrel 121.

External band heaters 122 and internal cartridge heaters 123 in torpedoes 124 and 124' supply heat to the external and internal walls of melting chamber 120 in a manner similar to that of the configuration of FIG. 1. The plastic gradually melts as it is forced forward along the length of chamber 120. The melt continues forward past torpedo supports 125, through screen pack 126, through breaker plate 127, and finally out through die head 128 as extrudate 129. Auxiliary band heaters 130 maintain the proper temperature at die head 128.

The desired cool screw temperature is maintained by conventional concentric internal screw cooling passages 145 and 145' similar to that shown in FIG. 1. The cool temperature of body 119 is maintained by cooling fins 142, such as are employed in conventional practice.

Thermal insulators 131, 132, and 132' serve a function equivalent to those of the embodiment of FIG. 1 in minimizing heat transfer into body 119 or screws 114 or 114' from adjacent heated parts.

Bearings 133 and 133' carry the thrust loads developed against screws 114 and 114' in forcing raw plastic 111 into melting chamber 120. Bolts 135 fasten barrel 121 to body 119, and bolts 136 fasten die head 128 to barrel 121.

In the embodiment of FIG. 2, pressure in the melt is developed by mechanical positive displacement of raw plastic 111 by screws 114 and 114', forcing it forward into melting chamber 120. In this embodiment, any tendency toward back-flow due to material plasticity is prevented inasmuch as thread grooves 140 and 140' of screws 114 and 114' are blocked mutually at the line of mesh 141. This positive displacement feature makes this embodiment somewhat more effective in feeding softer plastics or those which may tend to resist positive feed by a single screw (such as some powdered plastics).

Referring to FIG. 3, raw extrudable material 211 (in pellet or powder form) contained in supply hopper 212 enters the extruder through inlet opening 213. Screw 214, driven by means of shaft 215 which may be powered from an outside source, rotates in bore 218 at the inlet end of extruder body 219 and forces extrudable material 211 forward into melting chamber 220 toward the outlet end of body 219.

Heat from external sources 222 is transferred by conduction into melting chamber 220, softening the material gradually as it is forced forward. The softened material is finally forced out through die head 228 as extrudate 229. The proper temperature is maintained in the vicinity of die head 228 by means of auxiliary heat source 230.

The desired cool screw temperature is maintained by conventional concentric internal screw cooling passage 245. Cooling fins 241 of conventional practice maintain a cool temperature of body 219.

In the embodiment of FIG. 3, no thermal insulator as such is used to minimize heat conduction in body 219, but rather intermediate body portion 231, having sufficient length to serve an equivalent purpose, is used. By this means, in steady-state flow a major portion of heat conducted back through body 219 is transferred to colder material along intermediate body portion 231, and effectively little heat reaches bore 218 or screw 214.

Helical grooves 240 in bore 218, equivalent to those of the embodiment of FIG. 1, are used to facilitate the mechanical force-feeding action of screw 214 on material 211. In addition, more screw flights may be used to develop higher melt pressures if so desired. Bearing 233, backed up by retaining ring 234, carries the thrust load developed by screw 214 in thus acting against material 211.

All three embodiments shown and described employ a similar essential and distinguishing principle wherein the major portion of the melting heat is transferred to the plastic or extrudable material directly by conduction from external sources, and wherein only a very minor portion of the melting heat is converted indirectly from mechanical shaft energy through the action of friction and internal shear. This is one important feature of the invention, since it permits full control of heat input separate from and independent of shaft speed or power input. The input of virtually all of the melting heat directly in this manner also greatly reduces the size of the drive motor, shafting, and speed reduction gearing required inasmuch as virtually none of the melting heat is now converted from shaft energy.

Closely related to the method of heat input is the method of pressure build-up employed, which is another essential and distinguishing feature of this invention, and which involves:

(a) A purely mechanical force-feeding action on the raw plastic or extrudable material.

(b) This force feeding action developing the full melt pressure by "pushing from behind."

(c) Virtually no viscous shear pressure build-up in the melt.

In order to achieve the ideal mechanical force-feeding action and the resultant pressure build-up, it is a practical necessity that the screw act on hard material. As was explained previously, this invention employs a "cold" screw, and one in which the screw operates in a relatively cool zone of the extruder, so that the material being fed remains as hard as possible. In order to maintain this relatively cool zone around the screw, the insulation previously described is used, and in addition, cooling (or even refrigeration) of the bore and the screw is used.

The extrusion pressure obtainable is affected not only by the material hardness in the screw zone, but also by the design of the screw itself. Without specifying exact design details, it is pertinent to note that the number of thread turns is a primary design factor affecting pressure, and that the screw pitch, thread multiple, thread geometry, and the groove pattern in the bore walls are other design factors affecting the pressure.

From the standpoint of out-gassing, the extruder of this invention offers a significant advantage. Because of the straight and short escape path from the zone of full melting back out through the inlet, and because of the absence of viscous shear in the melt (reducing gas entrainment and local overheating which would ordinarily require auxiliary venting means), out-gassing is greatly facilitated. This feature is of definite advantage, especially where the raw plastic is in powder form.

While the absence of viscous shear is of some advantage with certain sensitive materials, notably vinyls, little mixing is possible without the use of auxiliary equipment. However, since this invention, particularly the embodiment of FIG. 2, is ideally suited to the handling of powdered plastics (including the use of dry blended pigments) good results can be obtained even without mixing. With uniformly precolored or uncolored pellet plastics, surprisingly good results can be obtained in spite of the lack of mixing.

On the other hand, with blends of colored pellets or in other cases requiring mixing, it is possible to introduce auxiliary mixing means designed to produce the proper degree of viscous shear in the melt for mixing purposes. Again, in keeping with the objects of this invention, the degree of viscous shear introduced for mixing purposes may be controlled over a complete range fully independent of the other functions already described. These mixing means are not specified herein because of the variety of means known in the art, and also in order to not limit this invention with respect to a somewhat secondary, and possibily arbitrary, feature.

The embodiment of FIG. 3, without torpedo or screen pack, may be employed to extrude materials other than thermoplastics, such as some metals or other extrudable materials. In similar manner, other embodiments employing identical or basically similar principles may be devised to suit a wide variety of specific applications. It should therefore be understood that this invention is not limited to the specific construction shown and described except as so provided in the appended claims. Those skilled in the art will understand that a variety of other embodiments are possible without departure from the principles set forth.

I claim:
1. In an extruder of the type described:
   a cool bore;
   mechanical force-feed screw means rotatable in said cool bore;
   feed grooves in said cool bore co-acting with said screw means;
   cooling means for said bore;
   cooling means for said screw;
   a separate melting chamber communicating with said cool bore;
   heating means for said melting chamber;
   means of limiting heat conduction between said melting chamber and said bore;
   the entirety of said screw means contained within the length of said cool bore;
   a raw material inlet for said bore;
   and, an extrudate outlet for said melting chamber.

2. An extruder according to claim 1 wherein said means of limiting heat conduction comprises insulation between said melting chamber and said cool bore.

3. An extruder according to claim 1 wherein said heating means for said melting chamber comprises internal and external heating elements.

References Cited by the Examiner
UNITED STATES PATENTS

| | | | |
|---|---|---|---|
| 1,375,623 | 4/1921 | Bartels | 18—12 |
| 1,902,295 | 3/1933 | Shook | 18—12 |
| 2,177,658 | 10/1939 | Kimbel et al. | |
| 2,449,355 | 9/1948 | Wiley et al. | 18—12 |
| 2,501,595 | 3/1950 | Bohannon. | |
| 2,653,349 | 9/1953 | Elgin et al. | 18—12 X |
| 2,702,408 | 2/1955 | Hartland. | |
| 2,744,287 | 5/1956 | Parshall et al. | 18—12 |
| 2,765,491 | 10/1956 | Magerkurth | 18—12 |
| 2,916,769 | 12/1959 | Baigent | 18—12 X |
| 3,009,202 | 11/1961 | Maccaferri | 18—30 |
| 3,060,512 | 10/1962 | Martin et al. | 18—12 X |
| 3,162,704 | 12/1964 | Attanasio et al. | 18—30 X |

FOREIGN PATENTS 586,387  3/1947  Great Britain.

WILLIAM J. STEPHENSON, *Primary Examiner.*